United States Patent  (10) Patent No.: US 12,391,113 B2
Schadler et al.                (45) Date of Patent:    *Aug. 19, 2025

(54) MOTOR VEHICLE ADJUSTMENT DRIVE HAVING ANGLE MEASURING SENSOR

(71) Applicant: MAGNA Auteca GmbH, Weiz (AT)

(72) Inventors: Bernhard Hubert Schadler, Gersdorf an der Feistritz (AT); Martin Palvoelgyi, Markt Hartmannsdorf (AT)

(*) Notice: Subject to any disclaimer, the term of this patent is extended or adjusted under 35 U.S.C. 154(b) by 0 days.

This patent is subject to a terminal disclaimer.

(21) Appl. No.: 18/653,607

(22) Filed: May 2, 2024

(65) Prior Publication Data

US 2024/0410451 A1    Dec. 12, 2024

(30) Foreign Application Priority Data

Jun. 6, 2023 (EP) .................................... 23177445

(51) Int. Cl.
  *F16D 7/10*      (2006.01)
  *B60K 17/28*     (2006.01)

(52) U.S. Cl.
  CPC ............... *B60K 17/28* (2013.01); *F16D 7/10* (2013.01)

(58) Field of Classification Search
  CPC . B60K 17/28; F16D 7/048; F16D 7/10; F16H 2035/005; F16H 35/10
  See application file for complete search history.

(56) References Cited

U.S. PATENT DOCUMENTS 2,459,092 A * 1/1949 Peterson ............... F16D 7/10
                                                   464/35
2,812,044 A * 11/1957 Cole, Jr. ............... F16B 1/04
                                                   192/223.2

(Continued)

FOREIGN PATENT DOCUMENTS

EP    3483477 A1   5/2019
EP    3567277 A1   11/2019

OTHER PUBLICATIONS

European Patent Office search report for EP23177445.6, mailed Nov. 3, 2023.

*Primary Examiner* — Minnah L Seoh
*Assistant Examiner* — Gregory T Prather
(74) *Attorney, Agent, or Firm* — Jordan IP Law, LLC; Todd A. Vaughn

(57) ABSTRACT

Adjustment drive includes an electric motor, a transmission, at least one engaging element, and a resilient element. The transmission has a self-locking transmission stage, a power takeoff, and a safety coupling that separates the self-locking transmission stage from an external torque in response to an excessive external torque introduced via the power takeoff. The safety coupling has a motor-side gearwheel with at least one coupling contour and at least one engaging contour, a power takeoff-side gearwheel, a free-running mechanism formed by the at least one coupling contour, and coupling elements operable to establish a positive-locking connection between the motor-side gearwheel and the power takeoff-side gearwheel. The at least one engaging element is rota- (Continued)

tionally secured to the motor-side gearwheel or the power takeoff-side gearwheel. The at least one resilient element pretensions the at least one engaging element against the at least one engaging contour to enable haptics of an external movement request introduced via the power takeoff.

20 Claims, 2 Drawing Sheets

(56) References Cited

U.S. PATENT DOCUMENTS

| | | | | |
|---|---|---|---|---|
| 6,769,527 | B1* | 8/2004 | Paris | F16D 67/02 |
| | | | | 192/16 |
| 12,145,438 | B1* | 11/2024 | Zhao | B60K 25/06 |
| 2003/0106763 | A1* | 6/2003 | Kimura | F16F 15/1331 |
| | | | | 192/56.5 |
| 2014/0157926 | A1 | 6/2014 | Jujisawa | |
| 2019/0200510 | A1* | 7/2019 | Chrysanthakopoulos | ................... |
| | | | | A01B 59/043 |
| 2021/0010574 | A1* | 1/2021 | Lee | H02K 7/1166 |
| 2024/0317203 | A1* | 9/2024 | Lindberg | B60W 10/02 |
| 2024/0410429 | A1* | 12/2024 | Schadler | H02K 7/116 |

* cited by examiner

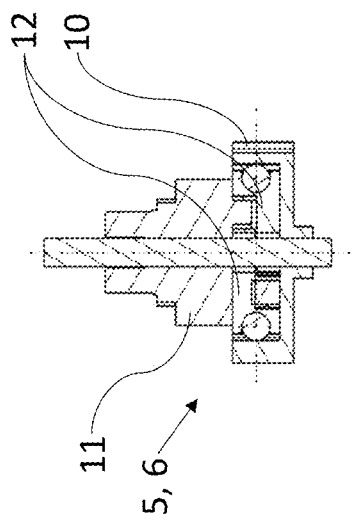
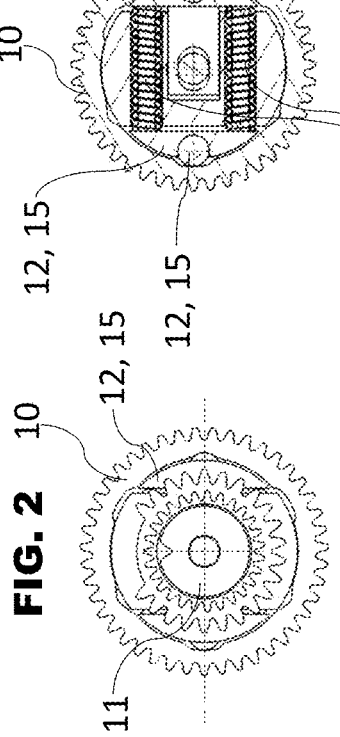
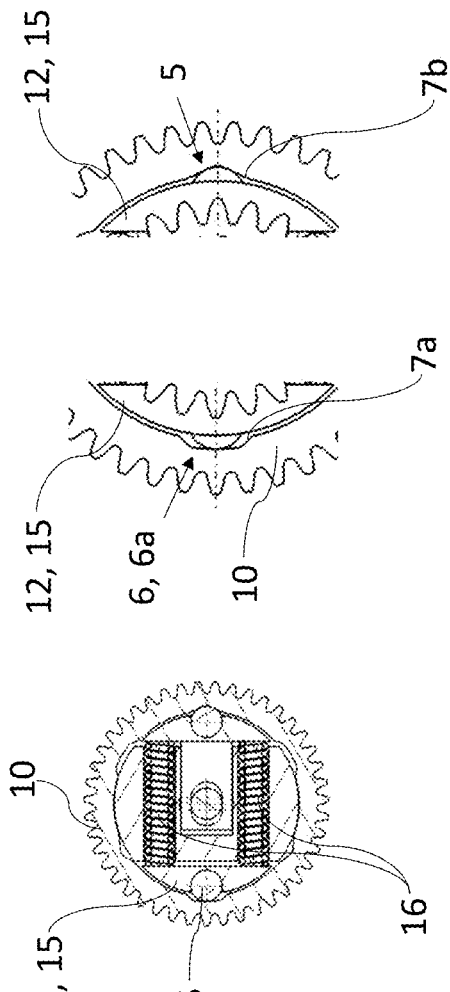
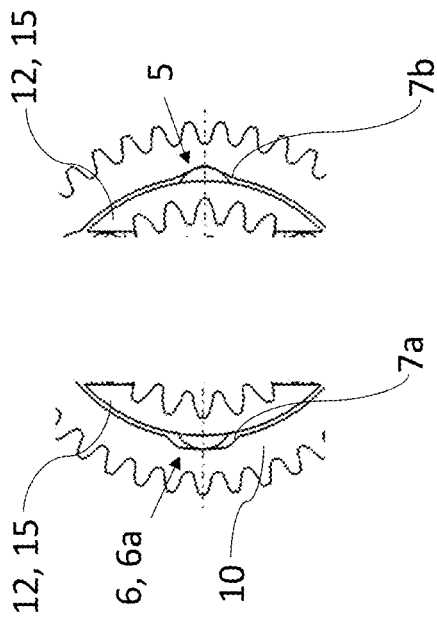
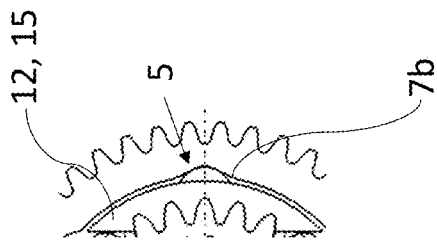

MOTOR VEHICLE ADJUSTMENT DRIVE HAVING ANGLE MEASURING SENSOR

CROSS-REFERENCE TO RELATED APPLICATIONS

The present application claims priority under 35 U.S.C. § 119 to European Patent Publication No. EP 23177445.6 (filed on Jun. 6, 2023), which is hereby incorporated by reference in its complete entirety.

TECHNICAL FIELD

The present disclosure relates to an adjustment drive comprising an electric motor and a transmission having a self-locking transmission stage, in particular an adjustment drive in a motor vehicle.

BACKGROUND

It is known that in motor vehicles adjustment drives are used in order, for example, to actuate flaps or doors via an electric drive. Such adjustment drives generally use electric motors which are as small as possible and often multi-stage transmissions for transmitting the torque. Often, such multi-stage transmissions of adjustment drives use a self-locking transmission stage and consequently form self-locking transmissions.

In order to protect a self-locking transmission from damage, it is often necessary to install a safety coupling which separates the self-locking transmission stage from the externally introduced torque in the event of an excessively great external torque. Particularly in the case of electrical flaps, handles and doors, a manual actuation (tip to run) is often also provided and activates the electrical mechanism (transmission) subsequently. Generally, the manual movement by partially uncoupling the coupling in combination with an angular measurement is detected and processed as a movement request with respect to the motor.

The haptics of a manually induced movement (tip to run) is dependent on the coupling torque and it is difficult to reach a consensus between haptics and the safety coupling for protecting the transmission. Furthermore, the safety-relevant component has to be newly adapted to the application repeatedly when using a standard transmission in different end applications in order to comply with the haptic requirements.

SUMMARY

An object of the disclosure is to improve an adjustment drive of the type mentioned in this regard and in particular to provide an adjustment drive comprising an electric motor and a transmission having a self-locking transmission stage which allows a safety coupling and a desired haptics with a manual actuation (tip to run) and which can be flexibly adapted to different requirements.

The object is achieved by an adjustment drive comprising an electric motor and a transmission having a self-locking transmission stage and having a power takeoff, wherein the transmission comprises a safety coupling which is configured to separate the self-locking transmission stage in the event of an excessively great external torque, i.e., a torque which is introduced via the power takeoff, from the external torque, wherein the safety coupling comprises a gearwheel at the motor and a gearwheel at the power takeoff, wherein the safety coupling uses coupling elements for a positive-locking connection between the gearwheel at the motor and the gearwheel at the power takeoff, wherein the coupling elements are pressed in the event of an excessively great external torque, i.e., a torque which is introduced via the power takeoff, by the excessively great external torque out of the positive-locking connection and consequently out of at least one coupling contour so that the self-locking transmission stage is separated from the external torque, wherein the safety coupling has a free-running mechanism, wherein the free-running mechanism is formed by the at least one coupling contour in the gearwheel at the motor or the gearwheel at the power takeoff, wherein at least one engaging element which is rotationally secure with respect to the other of the two gearwheels, the gearwheel at the motor or the gearwheel at the power takeoff, is pretensioned by a resilient element against at least one engaging contour so that the haptics of an external movement request, i.e., a movement request which is introduced via the power takeoff, is determined by the form of the engaging contour and consequently an engagement which determines the haptics is formed by the engaging contour.

In accordance with the disclosure, an adjustment drive has a safety coupling which can separate a self-locking transmission stage of the transmission of the adjustment drive in the event of an excessively great external torque from this external torque, i.e., opens in the event of a great applied torque. The safety coupling can be configured between two gearwheels of the transmission of the adjustment drive, in particular between two coaxial gearwheels.

The adjustment drive further has a free-running mechanism in order to take up a movement request from the exterior. The movement request can be detected and subsequently the electric motor and consequently the adjustment drive can be activated. Such functionality is also referred to as a "tip to run" mechanism.

In accordance with the disclosure two different torque-transmitting contours are provided in the coupling, i.e., at least one coupling contour and at least one engaging contour which are not formed by the same contour. One type of contour has a free-running mechanism, whereby at least one, preferably several circumferentially distributed coupling contours is/are formed, wherein at least one coupling element is pretensioned by a resilient element against the coupling contour. In order to be able to form a free-running mechanism, the coupling contour is configured to be wider than the coupling element which engages in the coupling contour. After overcoming the free-running mechanism, the lateral delimitations of the coupling contour form a positive-locking connection which determines the torque of the safety coupling.

The second type of torque-transmitting contours form engaging contours which can be formed according to desired haptics and the haptics of a movement request can be thereby selectively changed and consequently adjusted, furthermore they act on the free-running mechanism in a damping manner.

By using a coupling with a damped free-running mechanism which is integrated in the coupling, therefore, it is possible to adjust the haptics of the induced movement independently with respect to the uncoupling function of the safety coupling to a respective mechanism.

By using suitably formed engaging contours and coupling elements and by using resilient elements with the desired properties in the safety coupling, it is possible to bring about different haptic variations without great costs since the safety-relevant function of the coupling is not affected by the haptic adjustments.

Refinements of the disclosure are specified in the dependent claims, the description and the appended drawings.

Preferably, the adjustment drive comprises an angle measuring sensor and a control unit, wherein the control unit and the angle measuring sensor are configured so that the angle measuring sensor detects the external movement request and subsequently the control unit activates the electric motor.

Preferably, in order to form the free-running mechanism, the coupling contour forms a recess which is wider than the width of the coupling element which is pretensioned by the resilient element against the coupling contour. The term "width" is intended to be understood in this instance to mean in this specification the extent in the circumferential direction of the relevant gearwheel.

Preferably, at least some coupling elements are also coupling elements, and vice versa. The function of a coupling element and an engaging element can consequently be fulfilled by one and the same element.

Preferably, the form of the coupling contours for coupling elements in the gearwheel at the motor or in the gearwheel at the power takeoff differs from the form of the engaging contours for the positive-locking connections of the haptic-determining engagement in which the coupling contours are configured to be wider so that they form a free-running mechanism and the engaging contours are configured to be narrower so that they do not form a free-running mechanism, but instead a positive-locking connection.

Preferably, the coupling elements are pretensioned via the resilient elements, which also pretension the coupling elements—or via other resilient elements which are different from the resilient elements, i.e., other resilient elements, into the positive-locking connection and consequently into the coupling contour.

The coupling elements and/or the coupling elements may, for example, comprise balls or be balls. The balls or other projections can be configured, for example, at the end of a coupling element and/or engaging element and/or can be configured to abut the engaging contours or coupling contours.

Preferably, coupling elements and/or coupling elements are arranged opposite each other. At least one, preferably two resilient elements are preferably arranged between the two coupling elements and/or two coupling elements and pretension these two coupling elements and/or coupling elements away from each other into the coupling contour and/or into the engaging contour.

Over the circumference of the gearwheel, preferably the gearwheel at the motor, preferably three or more engaging contours and three or more coupling contours are formed, wherein preferably the engaging contours and the coupling contours always alternate with each other.

Preferably, the gearwheel at the motor and/or the gearwheel at the power takeoff are configured to be hollow, at least axially in portions. The coupling elements and/or the coupling elements and/or the resilient elements are then preferably arranged radially inside the gearwheel at the motor and/or the gearwheel at the power takeoff.

DRAWINGS

The disclosure is described below by way of example with reference to the drawings.

FIG. 2 shows a sectioned side view of a portion of the transmission of the adjustment drive of FIG. 1, in accordance with the disclosure according to FIG. 1.

FIG. 3 shows a top view of the portion of the transmission of FIG. 2.

FIG. 4 shows a sectioned top view, sectioned at the height of the resilient elements and coupling elements, towards the portion of the transmission of FIG. 2.

FIG. 5 shows a detailed left side view of the portion of the transmission of FIG. 3.

FIG. 6 shows a detailed right side view of the portion of the transmission of FIG. 3.

DESCRIPTION

Figure 1:
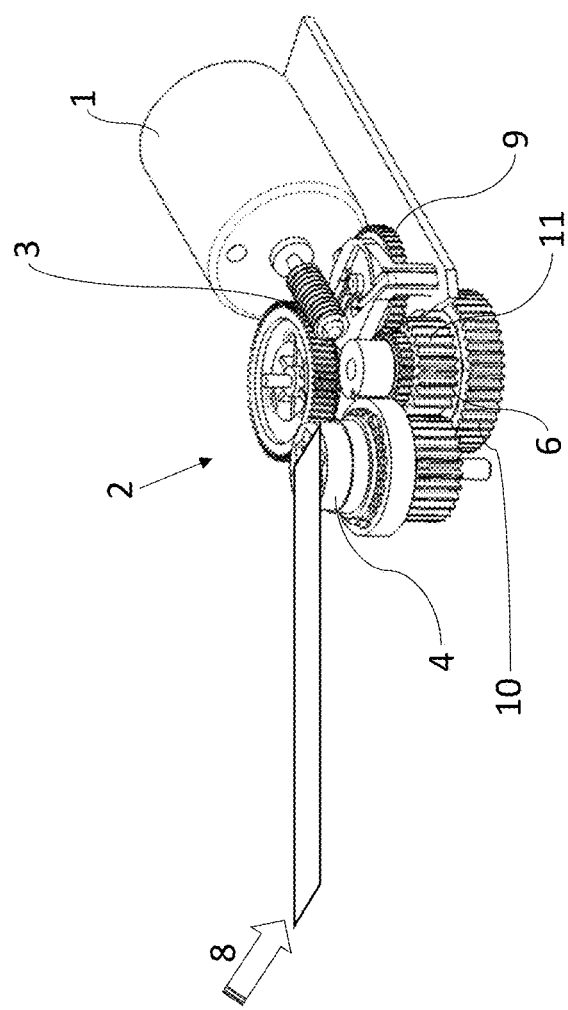
FIG. 1 shows a three-dimensional illustration of an adjustment drive in accordance with the disclosure.

FIG. 1 illustrates an adjustment drive in accordance with the disclosure together with a movement request 8, i.e., an external torque, which can be applied from the exterior, for example, via a handle, to the power takeoff 4 of the adjustment drive.

The adjustment drive comprises an electric motor 1 and a transmission 2. The transmission 2 in turn comprises a self-locking transmission stage 3 which can use, for example, a worm gear, a power takeoff 4, via which an element which is intended to be adjusted, such as a flap, door, etc., can be moved and additional transmission stages which can be located between the self-locking transmission stage 3 and the power takeoff 4.

The transmission 2 comprises a safety coupling 6 which is configured to separate the self-locking transmission stage 3 in the event of an excessively great torque, i.e., a torque which is introduced via the power takeoff 4, from the external torque. The safety coupling 6 is configured between two coaxial gearwheels of the transmission, i.e., between a gearwheel 10 at the motor and a gearwheel 11 at the power takeoff.

The adjustment drive further comprises an angle measuring sensor 9 and a control unit (not illustrated), wherein the control unit and the angle measuring sensor 9 are configured so that the angle measuring sensor 9 detects the external movement request 8 and subsequently the control unit activates the electric motor 1 in the case of a sufficiently powerful movement request 8 and sufficiently great angle change.

The gearwheel 10 at the motor and the gearwheel 11 at the power takeoff together with the haptic-determining engagement 5 and the safety coupling with free-running mechanism 6 are illustrated in FIGS. 2 to 6 in greater detail. The gearwheel 10 at the motor is at least axially partially configured in a hollow manner so that the elements of the haptic-determining engagement 5 and the safety coupling with the free-running mechanism 6 can be arranged radially inside the gearwheel 10 at the motor. As a result of the common center of the gearwheel 10 at the motor and the gearwheel 11 at the power takeoff, a common axis can be guided.

The haptic-determining engagement 5 is formed, as illustrated in FIG. 2, from a gearwheel 10 at the motor and a gearwheel 11 at the power takeoff, and from coupling elements 12 which can be connected in a rotationally secure manner to the gearwheel 11 at the power takeoff and which can form positive-locking connections with engaging contours 7b at the gearwheel 10 at the motor in order to connect the gearwheel 10 at the motor to the gearwheel 11 at the power takeoff.

The haptic-determining engagement 5 uses, as can clearly be seen in FIG. 4 and FIG. 6, a plurality of circumferentially distributed coupling elements 12, i.e., in the illustrated case with balls at the end, for a positive-locking connection between the gearwheel 10 at the motor and the gearwheel 11 at the power-takeoff, wherein the coupling elements 12 in the case of an external movement request, i.e., a torque which is introduced via the power takeoff 4, are pressed by the external torque from the positive-locking connection so that the gearwheel at the power takeoff can rotate relative to the self-locking transmission stage 3 about the free-running mechanism 6. The balls of the coupling elements 12 are arranged at radial end regions of the coupling elements 12. The coupling elements 12 are pretensioned via resilient elements 16, for example, helical pressure springs, into the positive-locking connection, i.e., towards the closed state of the coupling. The strength of the resilient elements 16, the form of the coupling elements 12 and the form of the engaging contour 7b determine the counter-torque which is perceptible at the power takeoff in the event of a movement request, i.e., the haptics of the tip-to-run function.

The safety coupling 6 has a free-running mechanism 6a formed by coupling contours 7a on the radially internal side of the hollow gearwheel 10 at the motor. The coupling elements 12 are rotationally secure with respect to the gearwheel 11 at the power takeoff are pretensioned by resilient elements 16 against the coupling contours 7a. The haptics of an external movement request 8, i.e., one which is introduced via the power takeoff 4, is therefore not influenced by the free-running mechanism 6a. The edge regions of the coupling contour 7a, the delimitations of the free-running mechanism 6a, determine the greatest possible transmissible torque of the safety coupling. When a great external torque is applied to the power takeoff 4, initially the coupling elements 12 are pressed out of the haptic-determining engagement 5 and the coupling wheel at the power takeoff can be rotated with a specific counter-torque which is determined via the engaging contour 7b in the free-running mechanism 6a with respect to the self-locking transmission stage 3. Should the free-running mechanism 6a be consumed and the external torque is great enough to press the coupling elements 15 inwards over the coupling contour 7b, the power takeoff 4 is then completely separated from the self-locking transmission stage 3.

In order to form the free-running mechanism 6a, the coupling contours 7a form recesses which are wider than the width of the radial ends, which engage in the coupling contours 7a, of the coupling elements 15 which are pretensioned against the coupling contours 7a by the resilient element 16.

The coupling elements 12 are at the same time coupling elements 15. Only the form of the coupling contours 7a for coupling elements 15 differ, in the gearwheel 10 at the motor, from the form of the engaging contours 7b for the positive-locking connections of the haptic-determining engagement 5, in which the coupling contours 7a are configured to be wider so that they form a free-running mechanism 6a and the engaging contours 7b are configured to be narrower so that they do not form a free-running mechanism.

The coupling elements 15 are pretensioned via the resilient elements 16 into the positive-locking connection and consequently into the coupling contour 7a and the coupling elements 12 are pretensioned via the resilient elements 16 into the engaging contour 7b. The coupling elements 15 and the coupling elements 12 comprise at the radial ends thereof balls or other projections.

As can clearly be seen in FIG. 4, two coupling elements 12 which also constitute two coupling elements 15 are arranged opposite each other and two resilient elements 16 are arranged between the two coupling elements 12 or between the two coupling elements 15 in order to press the two elements apart and to pretension them into the coupling contours 7a and into the engaging contours 7b.

In order to protect a self-locking transmission from damage, consequently, a safety coupling is installed. In order to identify a movement request 8 (tip to run), an angle measuring sensor 9, for example, a potentiometer or Hall effect sensor, is provided between the self-locking transmission stage 3 and the gearwheel 10 on the drive of the coupling 6. In order to make the haptic requests of the movement request 8 (tip to run) adjustable, in the coupling 6 a free-running mechanism 6a and a simply variable engaging contour 7b are provided.

The free-running mechanism 6a allows a rotation of the backward-driven gearwheel at the power takeoff side 11 relative to the gearwheel 10 at the drive without activating the uncoupling mechanism of the safety coupling 6.

In order to define the coupling torque, there are introduced coupling elements 15 which have to be pressed inwards via resilient elements 16 at the end of the free-running mechanism 6a over the coupling contour 7a. In order to define the haptics of the movement request 8 (tip to run) and to damp the free-running mechanism 6a, there are introduced coupling elements 12 which engage in engaging contours 7b via resilient elements 16. The adjustment of the coupling torque and the torque for the movement request 8 is defined by the contour at the respective engaging members, i.e., the engaging contours 7a and 7b, in conjunction with the resilient elements 16. By changing the engaging contours 7b, an independent adjustment of the torques is possible for the movement request 8 and for triggering the safety coupling 6.

By using independent engaging contours 7b and a free-running mechanism 6a in the safety coupling 6, it is possible when using common resilient elements 16 to bring about different haptic variations by changing the engaging contour 7b because the safety-relevant function of the coupling is separated from the haptic adjustments.

It is also possible to use independent resilient elements for coupling elements and coupling elements in order to produce an additional adjustability of the engaging torques.

Should a person apply a torque to the component which is connected to the power takeoff wheel 4, for example, a flap, a handle or the like, this component is flexible in accordance with the form of the engaging contour 7b and the size and form of the free-running mechanism 6a. The counter-torque (haptics) which are perceptible for the person is determined by the engaging contour 7b in this case. The rotation, which occurs in this case, of the power takeoff can be detected via an angle sensor 9 and can be used as a trigger for electrical adjustment.

LIST OF REFERENCE SYMBOLS

1 Electric motor
2 Transmission
3 Self-locking transmission stage
4 Power takeoff
5 Haptic-determining engagement
6 Safety coupling
6a Free-running mechanism
7a Coupling contour (wide)
7b Engaging contour (narrow)
8 Movement request
9 Angle measuring sensor
10 (First) Gearwheel at motor
11 (Second) Gearwheel at power takeoff 12 Engaging element
15 Coupling element
16 Resilient element

What is claimed is:

1. A motor vehicle adjustment drive, comprising:
an electric motor;
a transmission having a self-locking transmission stage, a power takeoff, and a safety coupling operable to separate the self-locking transmission stage from an external torque in response to an excessive external torque introduced via the power takeoff, the safety coupling having a motor-side gearwheel having at least one coupling contour and at least one engaging contour, a power takeoff-side gearwheel, a free-running mechanism formed by the at least one coupling contour, and coupling elements operable to establish a positive-locking connection between the motor-side gearwheel and the power takeoff-side gearwheel such that the coupling elements are pressed in response to the excessive external torque out of the at least one coupling contour to separate the self-locking transmission stage from the external torque;
at least one engaging element rotationally secure with respect to the motor-side gearwheel or the power takeoff-side gearwheel;
at least one resilient element operable to pretension the at least one engaging element against the at least one engaging contour so that haptics of an external movement request introduced via the power takeoff is enabled by the engaging contour and an engagement which causes the haptics is formed by the engaging contour;
an angle measuring sensor operable to detect the external movement request; and
a control unit operable to activate the electric motor in response to the detection of the external movement request.

2. The motor vehicle adjustment drive of claim 1, wherein the free-running mechanism is formed by a recess formed by the coupling contour, the recess having a width that is greater than a width of the coupling element which is pretensioned by the resilient element against the coupling contour.

3. The motor vehicle adjustment drive of claim 1, wherein at least some coupling elements also serve as engaging elements.

4. The motor vehicle adjustment drive of claim 1, wherein at least some engaging elements also serve as coupling elements.

5. The motor vehicle adjustment drive of claim 1, wherein the width of the at least one coupling contours is greater than the width of the at least one engaging contour.

6. The motor vehicle adjustment drive of claim 1, wherein the at least one resilient element is operable to pretension the at least one coupling element.

7. The motor vehicle adjustment drive of claim 1, wherein the coupling elements and/or the engaging elements comprise balls.

8. The motor vehicle adjustment drive of claim 1, wherein the engaging elements are arranged opposite each other.

9. The motor vehicle adjustment drive of claim 8, wherein the at least one resilient element is arranged between the engaging elements to pretension the engaging away from each other into the engaging contour.

10. The motor vehicle adjustment drive of claim 1, wherein the coupling elements are arranged opposite each other.

11. The motor vehicle adjustment drive of claim 10, wherein the at least one resilient element is arranged between the coupling elements to pretension the coupling elements away from each other into the coupling contour.

12. The motor vehicle adjustment drive of claim 1, wherein:
the engaging elements are arranged opposite each other, and
the coupling elements are arranged opposite each other.

13. The motor vehicle adjustment drive of claim 12, wherein:
the at least one resilient element is arranged between the engaging elements to pretension the engaging elements away from each other into the engaging contour, and
the at least one resilient element is arranged between the coupling elements to pretension the coupling elements away from each other into the coupling contour.

14. The motor vehicle adjustment drive of claim 1, wherein:
the motor-side gearwheel and/or the power takeoff-side gearwheel are configured to be hollow, at least axially in portions, and
the at least one engaging element and/or the at least one coupling element and/or the at least one resilient element are arranged radially inside the motor-side gearwheel and/or the power takeoff-side gearwheel.

15. The motor vehicle adjustment drive of claim 1, wherein the motor-side gearwheel and the takeoff-side gearwheel are coaxial.

16. The motor vehicle adjustment drive of claim 15, wherein the safety coupling is configured between the coaxial motor-side gearwheel and the takeoff-side gearwheel.

17. A motor vehicle adjustment drive, comprising:
an electric motor;
a control unit operable to activate the electric motor;
a transmission having a self-locking transmission stage, a power takeoff, and a safety coupling operable to separate the self-locking transmission stage from an external torque in response to an excessive external torque introduced via the power takeoff, the safety coupling having a motor-side gearwheel having at least one coupling contour and at least one engaging contour, a power takeoff-side gearwheel, a free-running mechanism formed by the at least one coupling contour, and coupling elements operable to establish a positive-locking connection between the motor-side gearwheel and the power takeoff-side gearwheel such that the coupling elements are pressed in response to the excessive external torque out of the at least one coupling contour to separate the self-locking transmission stage from the external torque;
at least one engaging element rotationally secure with respect to the motor-side gearwheel or the power takeoff-side gearwheel;
at least one resilient element operable to pretension the at least one engaging element against the at least one engaging contour to enable haptics of an external movement request introduced via the power takeoff; and
an angle measuring sensor operable to detect the external movement request, wherein the control unit activates the electric motor in response to the detection of the external movement request.

18. A motor vehicle adjustment drive, comprising:
an electric motor;

a transmission having a self-locking transmission stage, a power takeoff, and a safety coupling operable to separate the self-locking transmission stage from an external torque in response to an excessive external torque introduced via the power takeoff, the safety coupling having a motor-side gearwheel having at least one coupling contour and at least one engaging contour, a power takeoff-side gearwheel, a free-running mechanism formed by the at least one coupling contour, and coupling elements operable to establish a positive-locking connection between the motor-side gearwheel and the power takeoff-side gearwheel such that the coupling elements are pressed in response to the excessive external torque out of the at least one coupling contour to separate the self-locking transmission stage from the external torque;

at least one engaging element rotationally secure with respect to the motor-side gearwheel or the power takeoff-side gearwheel;

at least one resilient element operable to pretension the at least one engaging element against the at least one engaging contour to enable haptics of an external movement request introduced via the power takeoff; and a sensor, arranged between the self-locking transmission stage and the motor-side gearwheel, operable to detect the external movement request; and a control unit operable to activate the electric motor in response to the detection of the external movement request.

19. The motor vehicle adjustment drive of claim 18, wherein the motor-side gearwheel and the takeoff-side gearwheel are coaxial.

20. The motor vehicle adjustment drive of claim 19, wherein the safety coupling is configured between the coaxial motor-side gearwheel and the takeoff-side gearwheel.

* * * * *